United States Patent
Wang

(10) Patent No.: US 10,654,313 B2
(45) Date of Patent: May 19, 2020

(54) WHEEL COVER UNIT FOR REAR WHEELS OF TRUCKS OR BUSES

(71) Applicant: Shih Feng Wang, Tainan (TW)

(72) Inventor: Shih Feng Wang, Tainan (TW)

( * ) Notice: Subject to any disclaimer, the term of this patent is extended or adjusted under 35 U.S.C. 154(b) by 133 days.

(21) Appl. No.: 15/951,133

(22) Filed: Apr. 11, 2018

(65) Prior Publication Data

US 2019/0232715 A1 Aug. 1, 2019

(30) Foreign Application Priority Data

Jan. 29, 2018 (TW) .................................. 107201400

(51) Int. Cl.
| | |
|---|---|
| *B60B 7/04* | (2006.01) |
| *B60B 7/14* | (2006.01) |
| *B60B 7/06* | (2006.01) |
| *B60B 7/00* | (2006.01) |
| B60B 11/00 | (2006.01) |

(52) U.S. Cl.
CPC .............. *B60B 7/04* (2013.01); *B60B 7/0026* (2013.01); *B60B 7/066* (2013.01); *B60B 7/068* (2013.01); *B60B 7/14* (2013.01); *B60B 7/0073* (2013.01); *B60B 11/00* (2013.01); *B60B 2900/1216* (2013.01); *B60Y 2200/14* (2013.01)

(58) Field of Classification Search
CPC .. B60B 7/04; B60B 7/06; B60B 7/066; B60B 7/068
See application file for complete search history.

(56) References Cited

U.S. PATENT DOCUMENTS

| | | | | | |
|---|---|---|---|---|---|
| 4,946,228 | A | * | 8/1990 | Hsu ........................... | B60B 7/06 301/108.4 |
| 5,358,313 | A | * | 10/1994 | Polka ........................ | B60B 7/04 301/108.4 |
| 5,443,582 | A | * | 8/1995 | Ching ....................... | B60B 7/14 301/37.26 |
| 5,645,324 | A | * | 7/1997 | Wright ..................... | B60B 7/14 301/108.4 |
| 5,820,225 | A | * | 10/1998 | Ferriss ................... | B60B 7/0013 301/37.371 |
| 6,595,596 | B1 | * | 7/2003 | Polka ........................ | B60B 7/02 301/37.102 |
| 6,637,833 | B2 | * | 10/2003 | Hsu ........................... | B60B 3/16 301/108.4 |
| 7,059,684 | B1 | * | 6/2006 | Polka ........................ | B60B 7/04 301/37.371 |
| 2019/0225011 | A1 | * | 7/2019 | Wang ....................... | B60B 7/04 |

* cited by examiner

*Primary Examiner* — Jason R Bellinger
(74) *Attorney, Agent, or Firm* — Raymond Y. Chan; David and Raymond Patent Firm

(57) ABSTRACT

A wheel cover unit for rear wheels of trucks or buses includes: a wheel cover, two attaching members and a cover. The wheel cover is provided with an inner concave portion having a central hole. The inner edge of the central hole is vertically and backwardly provided with a hole ring having two corresponding pairs of slots. Two pairs of lock tabs are extended from the two pairs of slots respectively to the central hole. Each attaching member is provided with a connecting element and an engaging element. The connecting element is formed with a connecting portion for passing through the bolts of the wheel. The engaging element is formed with two connecting pieces. Each connecting piece is locked with the lock tab by a screwed element, so as to assemble the wheel cover to the rear wheel of the truck or bus.

9 Claims, 7 Drawing Sheets

WHEEL COVER UNIT FOR REAR WHEELS OF TRUCKS OR BUSES

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a wheel cover unit, and more particularly to a wheel cover unit for rear wheels of trucks or buses.

Description of Related Arts

Both sides of a wheel of a truck or bus are an inner concave surface and an outer convex surface, while front wheels of the truck or bus have only one front wheel on each side, so the outer convex surface of the front wheel will be located on the outer side of the front wheel for smooth driving. However, two rear wheels are generally installed on each side to increase the stability of the attaching capacity, so the wheels of the rear wheels must be two, and the wheels of the two rear wheels on the same side must be convex face to face in order to be locked together, so, this is the reason why the inner concave surface of the outer wheel is located on the outer side.

In addition to increase beauty, the wheel cover can also reduce wind resistance and achieve the efficiency of oil saving. Especially, the inner concave surface of the rear wheel is located on the outer side, and the wind resistance is large. If the rear wheel can be installed with the wheel cover, it has the advantage of reducing the wind resistance and saving oil.

The present invention has arisen to mitigate and/or obviate the afore-described disadvantages.

SUMMARY OF THE PRESENT INVENTION

The primary objective of the present invention is to provide an effective technical solution to solve the defect that the wheel of the existing truck or bus's rear wheel has failed to install the wheel cover.

To achieve the above objective, a wheel cover unit for rear wheels of trucks or buses in accordance with the present invention comprises: a wheel cover, two attaching members and a cover. The wheel cover is provided with an inner concave portion having a central hole in the center thereof. The inner edge of the central hole is vertically and backwardly provided with a hole ring having two corresponding pairs of slots. Two pairs of lock tabs are extended from the two pairs of slots respectively to the central hole. Each attaching member is provided with a connecting element and an engaging element. The connecting element is formed with a connecting portion for passing through the bolts of the wheel. The engaging element is formed with two connecting pieces. Each connecting piece is locked with the lock tab by a screwed element, and the connecting element is connected to the engaging element, so as to assemble the wheel cover to the rear wheel of the truck or bus.

The engaging element is also formed with an engaging portion, the connecting pieces are extended inwardly from the engaging portion. Each connecting piece is also engaged in the slot. When the connecting piece is locked with the lock tab by the screwed element, a distance is formed between the connecting piece and the lock tab, so that the locking tightness can be increased when the screwed element is used.

The connecting element can be locked with the engaging element in such a manner that the suitable overall length of either the connecting element or the engaging element is adjustable. The connecting element is defined with an elongated hole and a plurality of first grooves. The engaging element is defined with at least two square holes and a plurality of second grooves. When connecting the connecting element with the engaging element, the first groove is selectively engaged in the second groove, and a screw assembly passes through the square holes and the elongated hole. The screw assembly has a body having a square portion passing through the square hole, and the body passes through the elongated hole, such that the connecting element can be locked with the engaging element in such a manner that the suitable overall length of either the connecting element or the engaging element can be adjusted.

The engaging element is further defined with a plurality of third grooves having at least one first datum line and one second datum line, which enables the connecting element to be selectively engaged in the engaging element with the joint reference, so as to increase the stability of joint.

In addition, a plurality of ribs is protruded on the inner side of the inner concave portion, which can increase the structural strength of the wheel cover and reduce the thickness of the wheel cover, saving the material cost.

Moreover, a cover ring is backwardly extended from the cover and is defined with a slot corresponding to the lock tab, so that the cover can be engaged in the central hole of the wheel cover. Also, an engaging portion is provided at a bottom side of the cover ring of the hole cover. When the cover is engaged in the central hole, the engaging portion is engaged in the hole ring. The cover ring of the cover also has a plurality of grooves.

To summarize, the lock tabs are added at the central holes of the wheel cover, and by the connection of the length-adjustable attaching member, the wheel cover can be locked to the wheel of the rear wheel, and the larger ring cover can also be applied to the rear wheel of a large truck or bus, which can ensure the locking stability.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENT

Figure 1:
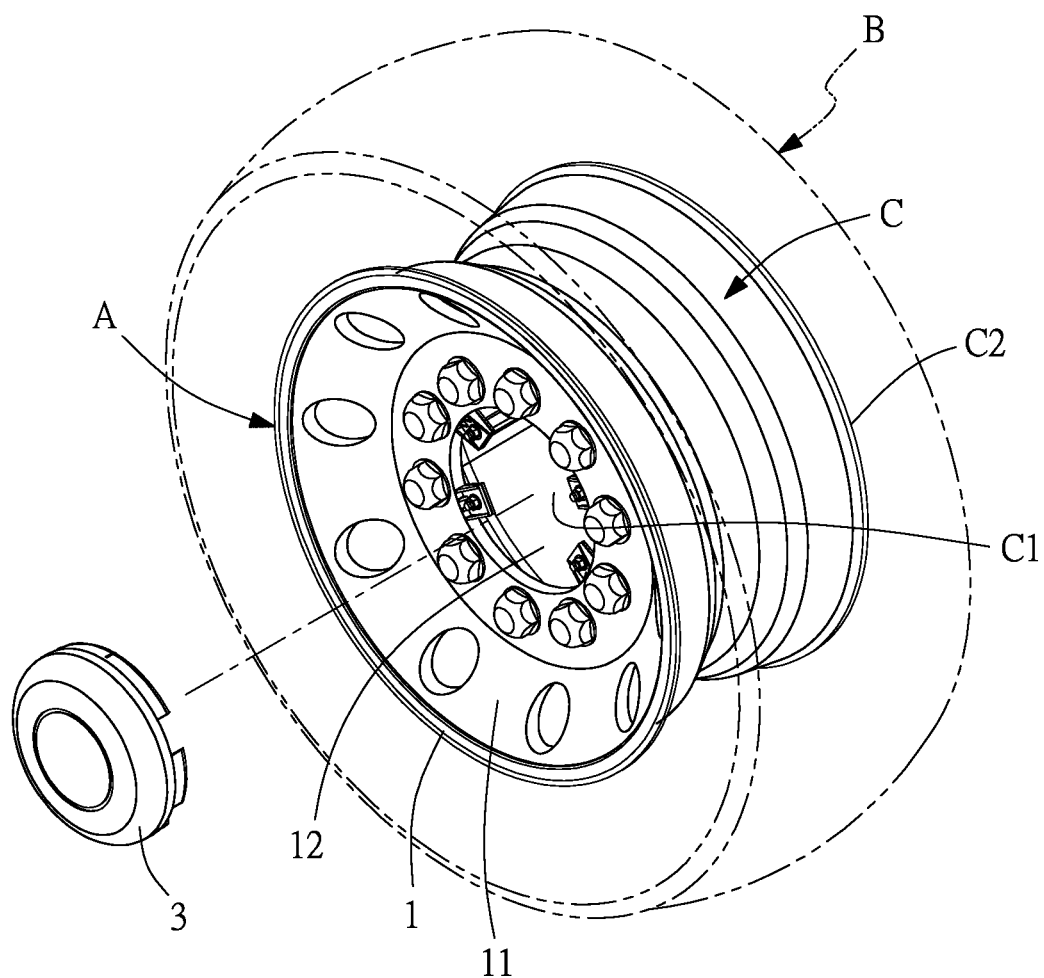
FIG. 1 is a perspective view of a wheel cover unit for rear wheels of trucks or buses in accordance with the present invention.
Figure 2:
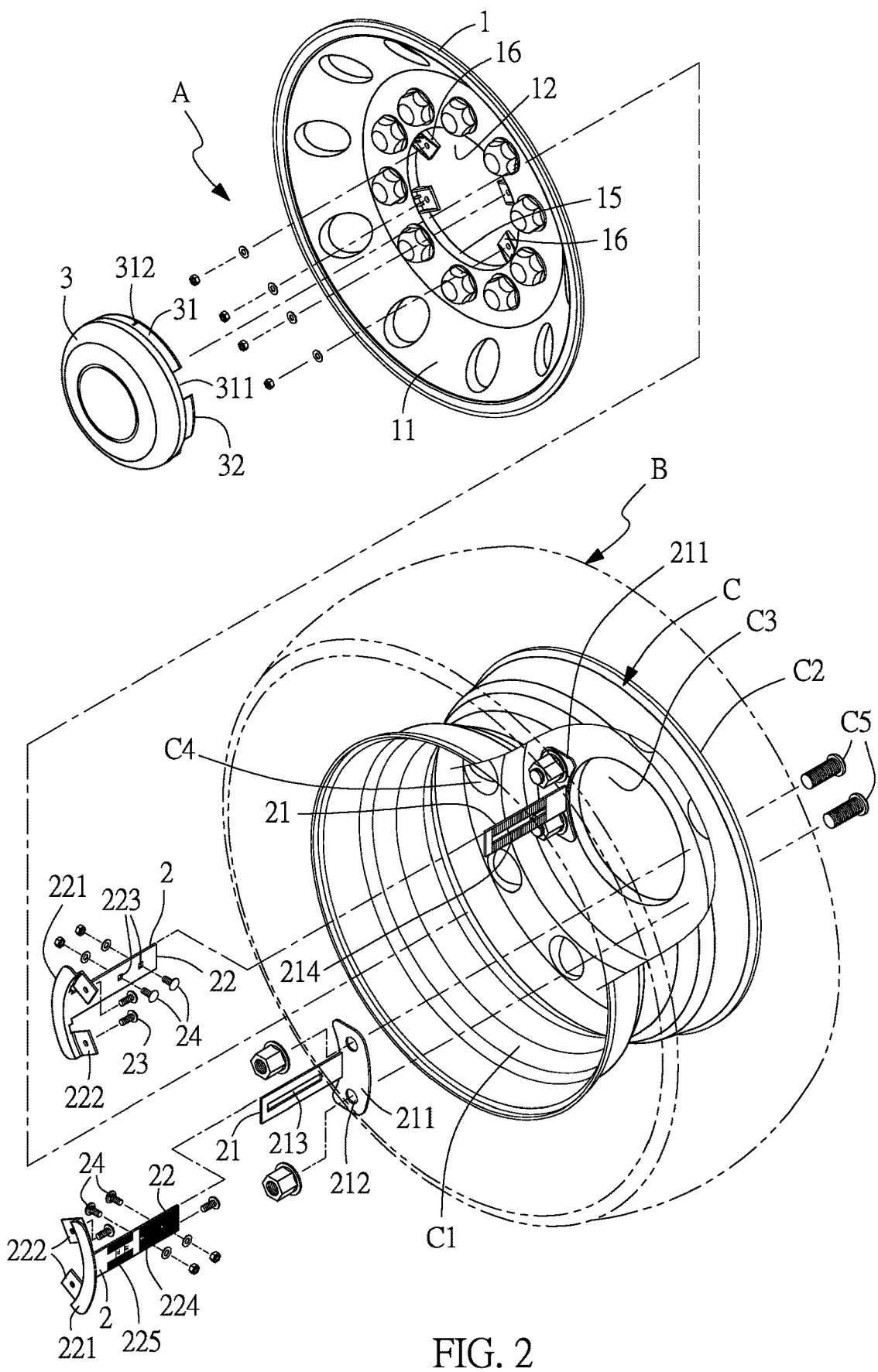
FIG. 2 is an exploded view of FIG. 1 in accordance with the present invention.
Figure 4:
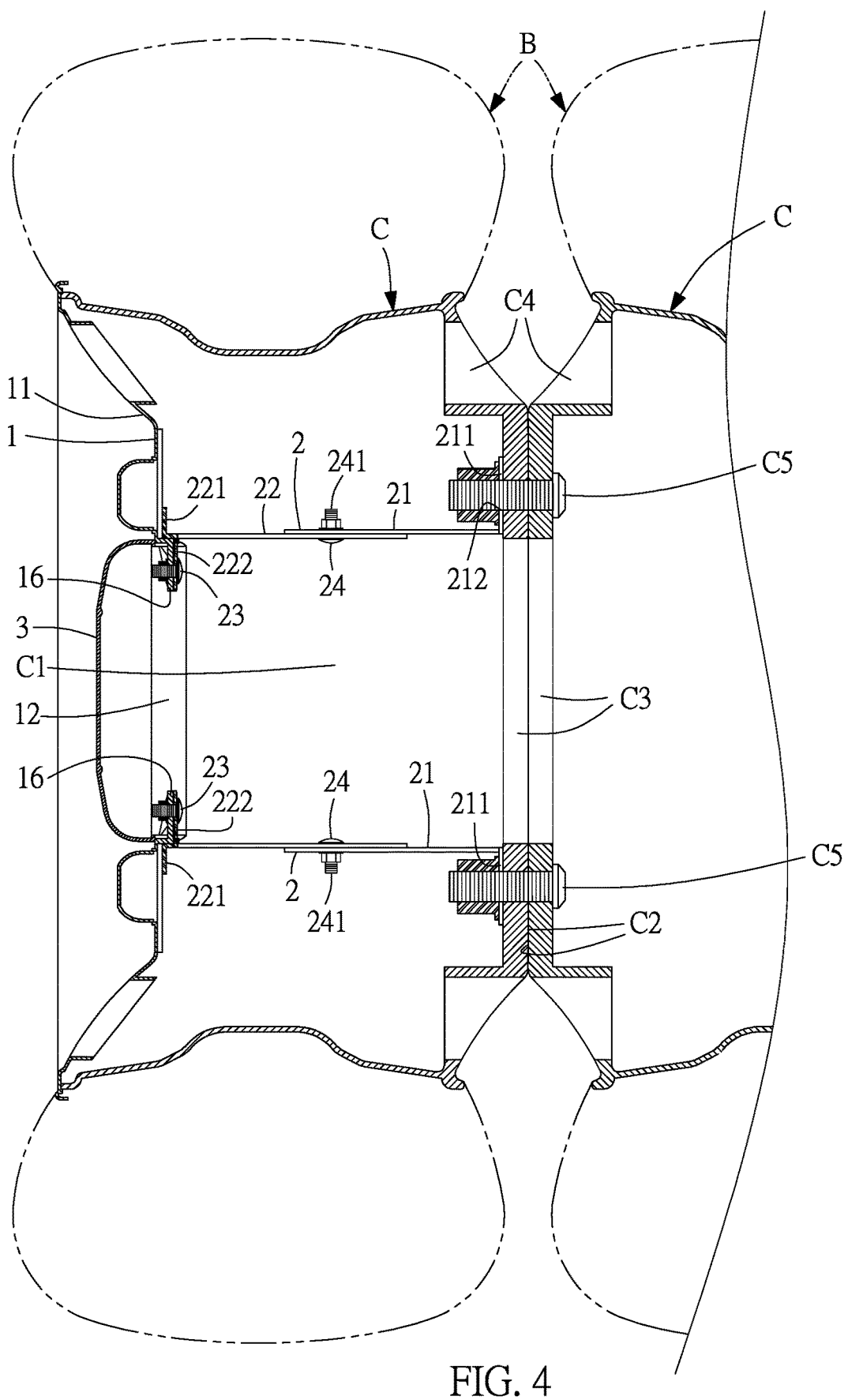
FIG. 4 is a plan cross sectional view of the wheel cover unit for rear wheels of trucks or buses in accordance with the present invention.

Referring to FIG. 1, a wheel cover unit A in accordance with a preferred embodiment of the present invention can be assembled to a wheel C of a rear wheel B of a truck or bus. The wheel C has an inner concave surface C1 and an outer convex surface C2 (as shown in FIGS. 2 and 4), and the inner concave surface C1 is located on an outer side of the wheel C (as shown in FIG. 4). The wheel C is defined with an intermediate hole C3 and a plurality of perforating holes C4 on the outer convex surface C2, and between the intermediate hole C3 and the perforating holes C4 is annularly assembled a plurality of bolts C5. The wheel cover unit A includes a wheel cover 1, two attaching members 2 and a cover 3 (as shown in FIG. 2).

Figure 3:
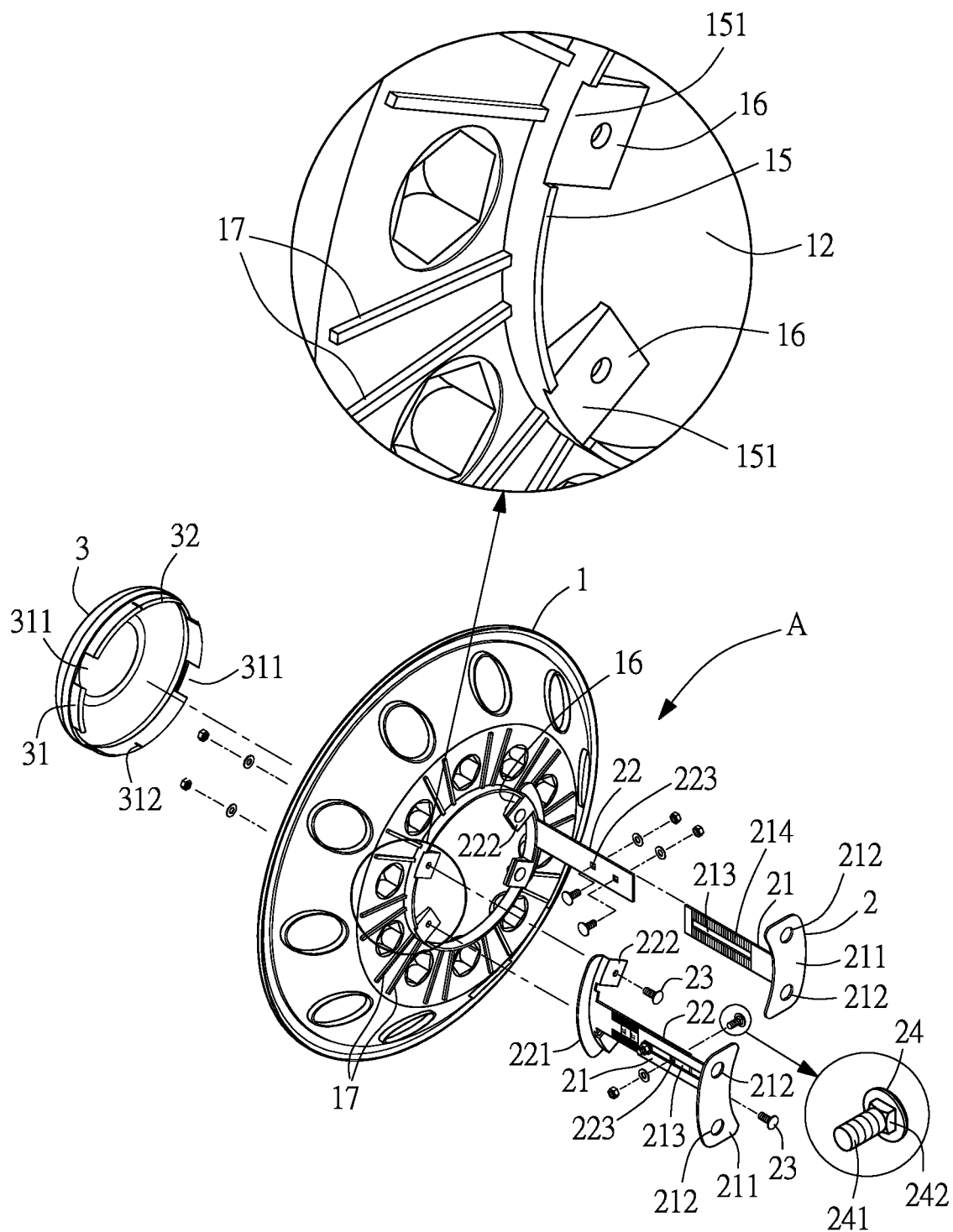
FIG. 3 is a perspective and partial enlarged view of a wheel cover of FIG. 2.

Referring to FIG. 2, the wheel cover 1 is provided with an inner concave portion 11 having a central hole 12 in the center thereof. The inner edge of the central hole 12 is vertically and backwardly provided with a hole ring 15 having two corresponding pairs of slots 151 (as shown in FIG. 3). Two pairs of lock tabs 16 are extended from the two pairs of slots 151 to the central hole 12. Viewed from the external side, the lock tab 16 is positioned lower than the edge of the central hole 12 and is vertical to the hole ring 15. Moreover, a plurality of ribs 17 is protruded on the inner side of the inner concave portion 11 (as shown in FIG. 3), which can increase the structural strength of the wheel cover 1 and reduce the thickness of the wheel cover 1, saving the material cost.

Figure 5:
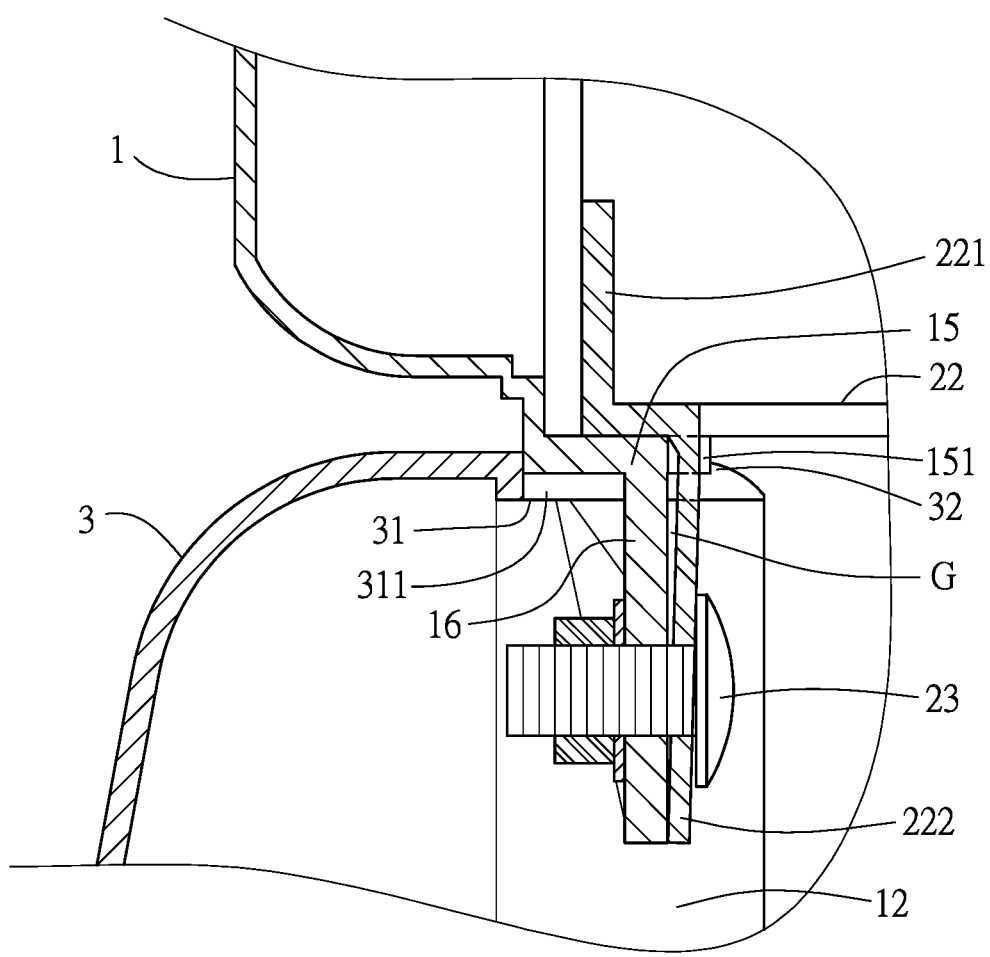
FIG. 5 is a partial enlarged view of the main structure of FIG. 4.

Referring to FIGS. 2-4, each attaching member 2 is provided with a connecting element 21 and an engaging element 22. The connecting element 21 and the engaging element 22 may be the same element and cannot be adjusted the overall length thereof (not shown), and also can be different elements that can adjust the suitable overall length thereof. The connecting element 21 is vertically formed with a connecting portion 211 having two through holes 212 for passing through the bolts C5 of the wheel C. The engaging element 22 is vertically formed with an engaging portion 221, two connecting pieces 222 are extended inwardly from the engaging portion 221. Each connecting piece 222 is engaged in the slot 151 and is locked with the lock tab 16 by a screwed element 23, so as to assemble the wheel cover 1 to the wheel C. When the connecting piece 222 is locked with the lock tab 16 by the screwed element 23, a distance G is formed between the connecting piece 222 and the lock tab 16 (as shown in FIG. 5), so that the locking tightness can be increased when the screwed element 23 is used.

Figure 6:
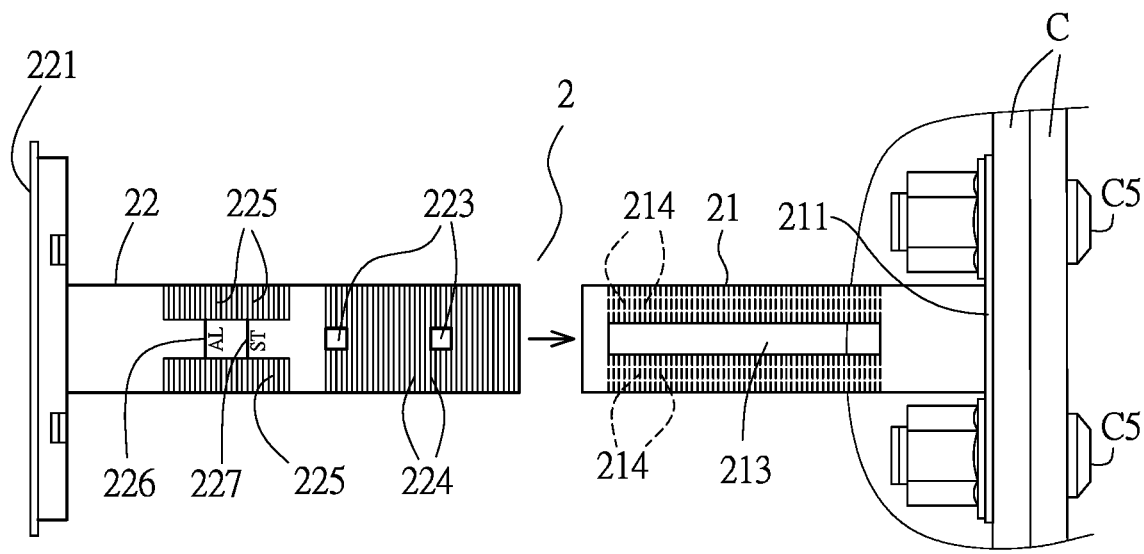
FIG. 6 is a plan view of attaching members in accordance with the present invention.
Figure 7:
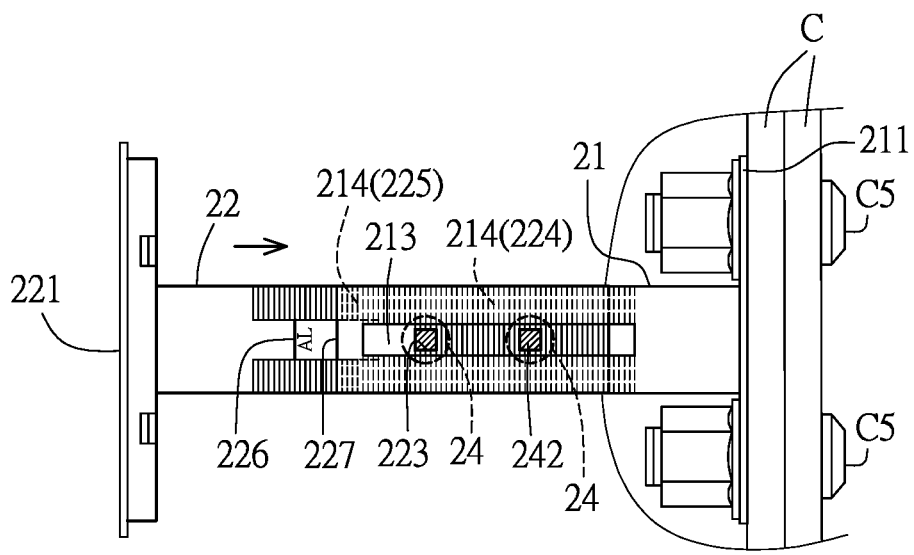
FIG. 7 is an assembly perspective view of the attaching members in accordance with the present invention.
Figure 8:
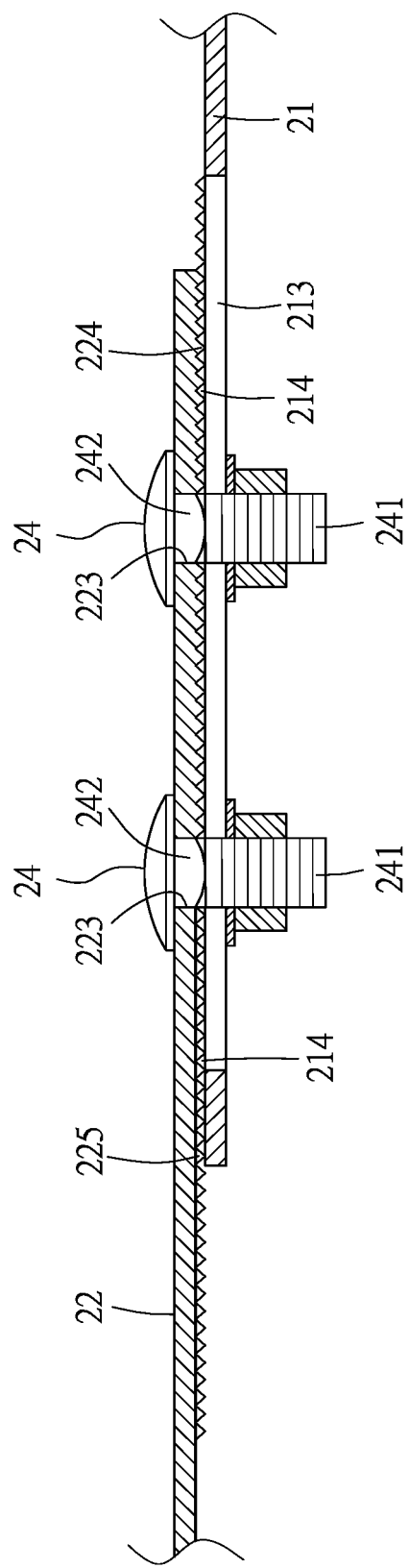
FIG. 8 is an assembly cross sectional view of the attaching members in accordance with the present invention.

Referring to FIG. 6, the connecting element 21 is defined with an elongated hole 213 and a plurality of first grooves 214. The engaging element 22 is defined with at least two square holes 223, a plurality of second grooves 224, a plurality of third grooves 225, at least one first datum line 226 and one second datum line 227. When connecting the connecting element 21 with the engaging element 22, the first groove 214 is selectively engaged in the second groove 224, and a screw assembly 24 passes through the square holes 223 and the elongated hole 213 (as shown in FIGS. 7-8). The screw assembly 24 has a body 241 having a square portion 242 (as shown in FIG. 3) passing through the square hole 223 (as shown in FIG. 8), and the body 241 passes through the elongated hole 213, such that the connecting element 21 can be locked with the engaging element 22 in such a manner that the suitable overall length of either the connecting element 21 or the engaging element 22 can be adjusted. Since the square portion 242 is fitted to pass through the square hole 223, the connecting element 21 can be locked with the engaging element 22 in an upright shape without bending. In addition, the third groove 225 can also be engaged with the first groove 214 to enhance the stability of joint, and the first datum line 226 and the second datum line 227 can represent the joint reference for the wheel C made of aluminum alloy or steel, respectively, which enables the connecting element 21 to be selectively engaged in the engaging element 22 with the joint reference.

Referring to FIG. 3, a cover ring 31 is backwardly extended from the cover 3 and is defined with a slot 311 corresponding to the lock tab 16 of the wheel cover 1, so that the cover 3 can be engaged in the central hole 12 of the wheel cover 1. Also, an engaging portion 32 is provided at a bottom side of the cover ring 31 of the hole cover 3. When the cover 3 is engaged in the central hole 12, the engaging portion 32 is engaged in the hole ring 15 (as shown in FIG. 5). The cover ring 31 of the cover 3 also has a plurality of grooves 312, which makes the cover ring 31 have an appropriate elastic margin for engaging in the central hole 12.

In operation, the wheel cover unit A is firstly locked with the C5 of the wheel C of the rear wheel B by the connecting portion 211 of the connecting element 21 of the attaching member 2 (as shown in FIG. 2), and then a joint reference for engaging the connecting element 21 in the engaging element 22 is chosen according to the aluminum alloy or iron made wheel C. Then, the first groove 214 is adjustably engaged in the second groove 224 and the third groove 225, which makes the connecting element 21 aligned to the first datum line 226 or the second datum line 227 (as shown in FIG. 7), and then the screw assembly 24 is locked to position the length of the attaching member 2 (as shown in FIG. 4). And then the central hole 12 of the wheel cover 1 is aligned to the intermediate hole C3 of the wheel C and the lock tab 16 is aligned to the connecting piece 22. At that time, the connecting piece 222 is engaged in the slot 151 of the hole ring 15 (as shown in FIG. 5), and the lock tab 16 is locked with the connecting piece 222 by the screwed element 23. In addition, due to the distance G between the connecting piece 222 and the lock tab 16, the locking tightness can be increased when the screwed element 23 is used, which can avoid the movement and the shedding of the wheel cover 1 when driving or the brake stops. Finally, the cover 3 is engaged in the central hole 12, and the engaging portion 32 is engaged in the hole ring 15.

It can be seen from the above structure that main idea of the invention lies in: the lock tabs 16 are added at the central holes 12 of the wheel cover 1, and by the connection of the length-adjustable attaching member 2, the wheel cover 1 can be locked to the wheel C of the rear wheel B, and the larger ring cover 1 can also be applied to the rear wheel B of a large truck or bus, so that the practicability of the invention is higher. Moreover, the wheel cover 1 and the cover 3 are plastic injection molding, which is light and strong, and more three-dimensional.

While we have shown and described various embodiments in accordance with the present invention, it should be clear to those skilled in the art that further embodiments may be made without departing from the scope of the present invention.

What is claimed is:

1. A wheel cover unit for rear wheels of trucks or buses, comprising: a wheel cover, two attaching members and a cover, the wheel cover being provided with an inner concave portion having a central hole, an inner edge of the central hole being vertically and backwardly provided with a hole ring having two corresponding pairs of slots, two pairs of lock tabs being extended from the two pairs of slots respectively to the central hole, each of the attaching members being provided with a connecting element and an engaging element, the connecting element being formed with a connecting portion and the engaging element being formed with two connecting pieces, each of the connecting pieces being locked with the lock tab by a screwed element, the connecting element being connected to the engaging element.

2. The wheel cover unit as claimed in claim 1, wherein the engaging element is formed with an engaging portion, and the connecting pieces are extended inwardly from the engaging portion, wherein the connecting pieces are engaged in the slots respectively, wherein when the connecting piece is locked with the lock tab by the screwed element, a distance is formed between the connecting piece and the lock tab.

3. The wheel cover unit as claimed in claim 2, wherein the connecting element is locked with the engaging element in such a manner that an overall length of either the connecting element or the engaging element is adjustable.

4. The wheel cover unit as claimed in claim 3, wherein an elongated hole and a plurality of first grooves are defined in the connecting element, and at least two square holes and a plurality of second grooves are defined in the engaging element, when the connecting element is connected with the engaging element, the plurality of first grooves is selectively engaged in the plurality of second grooves, wherein a screw assembly passes through the square holes and the elongated hole, wherein the screw assembly has a body having a square portion passing through the square hole, and the body passes through the elongated hole, such that the connecting element is locked with the engaging element.

5. The wheel cover unit as claimed in claim 4, wherein a plurality of third grooves having at least one first datum line and one second datum line is defined in the engaging element.

6. The wheel cover unit as claimed in claim 4, wherein a plurality of ribs is protruded on an inner side of the inner concave portion.

7. The wheel cover unit as claimed in claim 6, wherein a cover ring is backwardly extended from the cover and a slot is defined in the cover ring corresponding to the lock tab, so that the cover is engaged in the central hole of the wheel cover.

8. The wheel cover unit as claimed in claim 7, wherein an engaging portion is provided on a bottom side of the cover ring of the cover, wherein when the cover is engaged in the central hole, the engaging portion is engaged in the hole ring.

9. The wheel cover unit as claimed in claim 8, wherein the cover ring of the cover has a plurality of grooves.

* * * * *